United States Patent
Zhao et al.

(10) Patent No.: US 11,629,964 B2
(45) Date of Patent: Apr. 18, 2023

(54) NAVIGATION MAP UPDATING METHOD AND APPARATUS AND ROBOT USING THE SAME

(71) Applicant: UBTECH ROBOTICS CORP LTD, Shenzhen (CN)

(72) Inventors: Yongsheng Zhao, Shenzhen (CN); Zhichao Liu, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 393 days.

(21) Appl. No.: 16/843,923

(22) Filed: Apr. 9, 2020

(65) Prior Publication Data

US 2021/0190513 A1 Jun. 24, 2021

(30) Foreign Application Priority Data

Dec. 20, 2019 (CN) .......................... 201911330291.X

(51) Int. Cl.
*G01C 21/32* (2006.01)
*G05D 1/02* (2020.01)

(52) U.S. Cl.
CPC ............. *G01C 21/32* (2013.01); *G05D 1/024* (2013.01); *G05D 1/0272* (2013.01); *G05D 1/0274* (2013.01)

(58) Field of Classification Search
CPC .... G01C 21/32; G01C 21/3848; G05D 1/024; G05D 1/0272; G05D 1/0274; G05D 2201/02; G01S 17/875; G01S 17/88
See application file for complete search history.

(56) References Cited

U.S. PATENT DOCUMENTS

2004/0254677 A1* 12/2004 Brogardh ........... G05B 19/4083
700/250

FOREIGN PATENT DOCUMENTS

| CN | 107991683 A | 5/2018 |
| CN | 110268354 A | 9/2019 |
| CN | 110333720 A | 10/2019 |
| CN | 110530368 A | 12/2019 |

OTHER PUBLICATIONS

English Translation of CN-110333720-A (Chang).*
English Translation of CN-107991683-A (Lu).*
English Translation of CN-110530368-A (Hu).*

* cited by examiner

*Primary Examiner* — Rami Khatib
*Assistant Examiner* — Shahira Baajour

(57) ABSTRACT

The present disclosure discloses a navigation map updating method as well as an apparatus, and a robot using the same. The method includes: controlling a robot to move along a designated path after a successful relocalization of the robot, and recording key frame data of each frame on the designated path and a corresponding pose; creating a new navigation map, and copying information in an original navigation map into the new navigation map; and covering the key frame data of each frame on the designated path onto the new navigation map to obtain an updated navigation map. In this manner, there is no need for the user to manipulate the robot to recreate the map at the environment where the robot is operated, which saves a lot of time and manpower.

20 Claims, 5 Drawing Sheets

NAVIGATION MAP UPDATING METHOD AND APPARATUS AND ROBOT USING THE SAME

CROSS REFERENCE TO RELATED APPLICATIONS

The present disclosure claims priority to Chinese Patent Application No. 201911330291.X, filed Dec. 20, 2019, which is hereby incorporated by reference herein as if set forth in its entirety.

BACKGROUND

1. Technical Field

The present disclosure relates to robot technology, and particularly to a navigation map updating method as well as an apparatus, and a robot using the same.

2. Description of Related Art

When a robot localized based on lidar is to be navigated in an environment, it is generally necessary to first use a lidar to create a grid navigation map for the environment. With the navigation map, the robot can use a sensor such as a chassis odometer and a lidar to localize using the AMCL (adaptive Monte Carlo localization) method.

Since the object placement, furnishing materials, door and window positions, and switches in the environment where the robot moves gradually change with the passage of time, the original created lidar map will have more and more differences from the actual scene, and the stability and accuracy of the localization of the navigation of the robot will be decreased correspondingly. In this case, the localization will be prone to have drifts and errors while disturbed by human flow and dynamic objects during navigation. The localization errors during navigation will lead to navigation failures, and will even cause accidents such as fall downs and collisions, which will lead to serious consequences.

For the problem that the reliability of the navigation decreases after the scene of the navigation of the robot changes, which can be solved by updating the navigation map. However, in the prior art, after the scene changes, it needs the user to manipulate the robot to recreate the map at the environment where the robot is operated so as to generate a new navigation map, which will take much time and manpower in the process of recreating the map.

BRIEF DESCRIPTION OF THE DRAWINGS

In order to more clearly illustrate the technical solutions in the present disclosure, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

Figure 1:
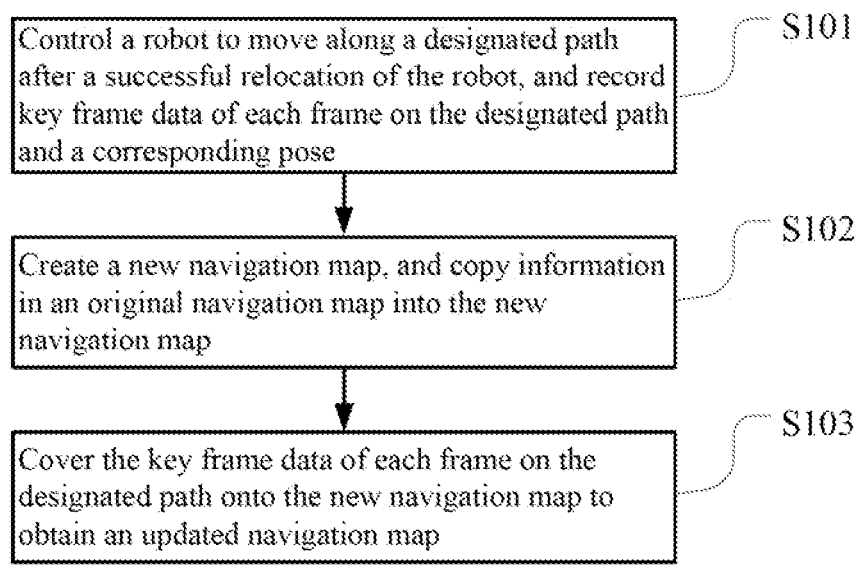
FIG. 1 is a flow chart of an embodiment of a navigation map updating method according to the present disclosure.
Figure 4:
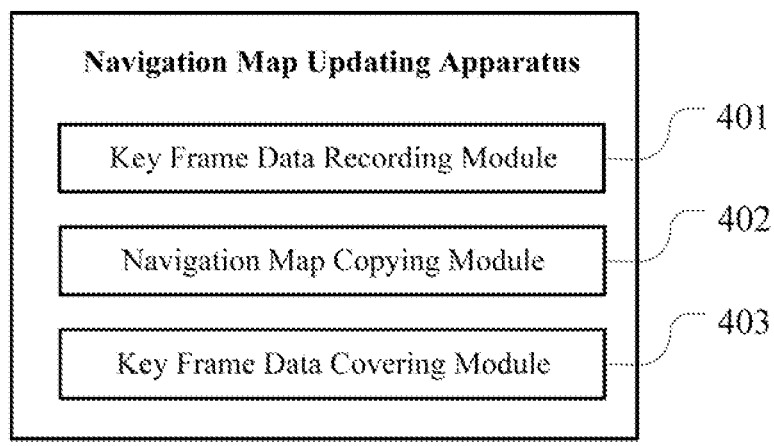
FIG. 4 is a schematic block diagram of an embodiment of a navigation map updating apparatus according to the present disclosure.
Figure 5:
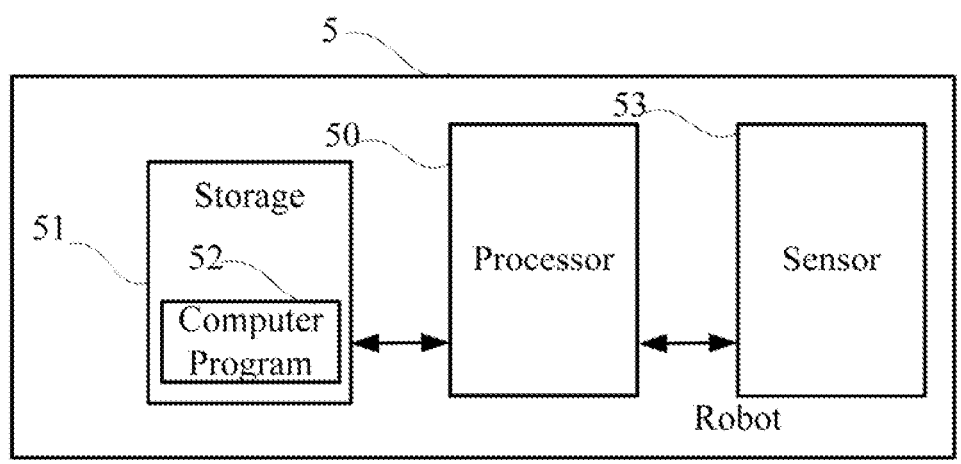
FIG. 5 is a schematic block diagram an embodiment of a robot according to the present disclosure.

FIG. 1 is a flow chart of an embodiment of a navigation map updating method according to the present disclosure. In this embodiment, a navigation map updating method is provided. The method is a computer-implemented method executable for a processor, which may be implemented through and applied to a navigation map updating apparatus as shown in FIG. 4 or implemented through a robot as shown in FIG. 5. As shown in FIG. 1, the method includes the following steps.

S101: controlling the robot to move along a designated path after a successful relocalization of the robot, and recording key frame data of each frame on the designated path and a corresponding pose.

When the navigation map needs to be updated, the robot can first perform be relocalized. In this embodiment, the relocalization can be realized using any relocalization algorithm to obtain the pose (i.e., the position and the posture) of robot on the map.

After the robot is successfully relocalized, the robot is controlled to move along the designated path, that is, a path in the scene that needs to be updated, and a part of the navigation map that is passed by the path will be updated. In an example, the designated path can be planned by a user in advance and imported into a storage medium of the robot, and after the relocalization is successful, the robot can directly read the designated path and automatically move along the designated path. In another example, the designated path may not be planned in advance, and the user can manually control the robot to pass the scene needs to be updated according to the current actual condition after the relocalization is successful, where the path actually passed by the robot is the designated path.

Figure 2:
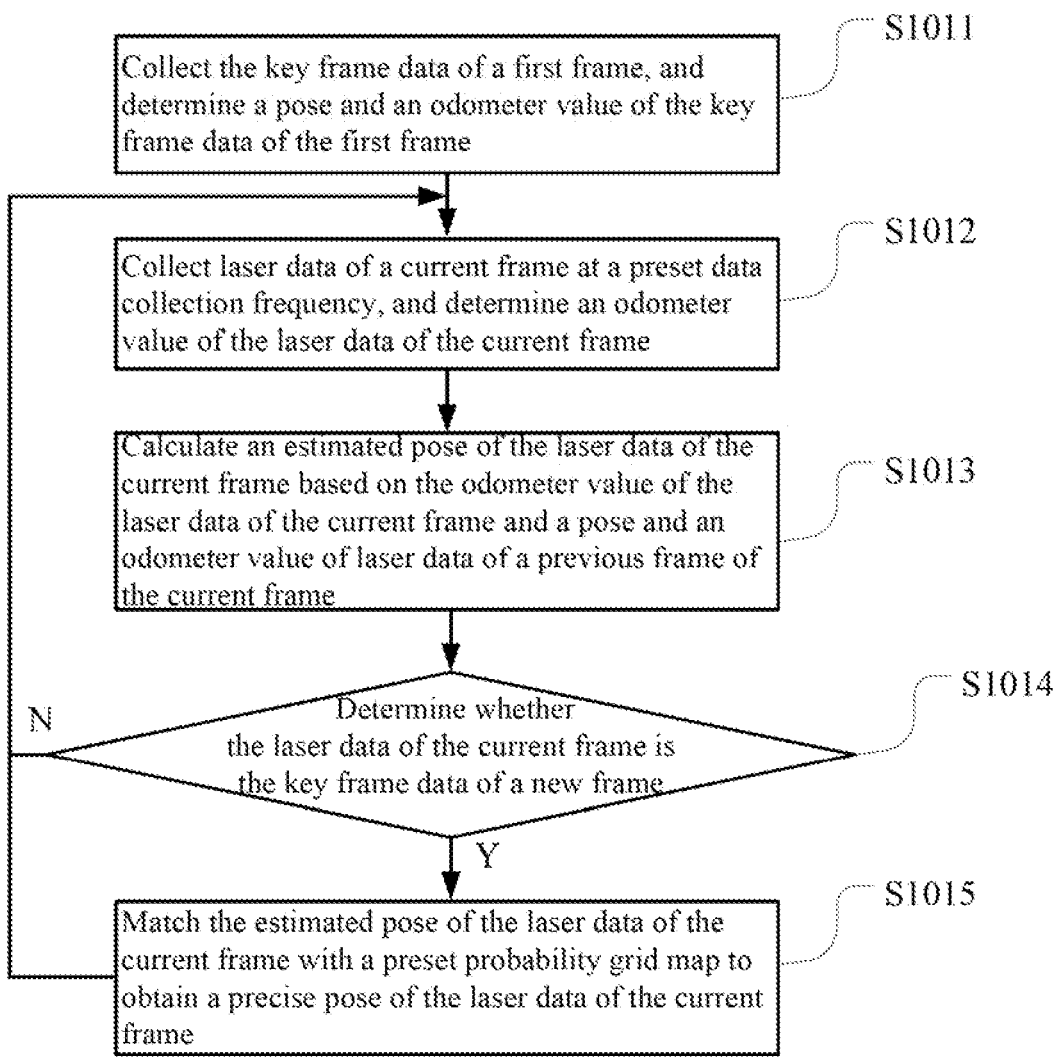
FIG. 2 is a flow chart of recording key frame data of each frame on a designated path and a corresponding pose according to an embodiment of the present disclosure.

FIG. 2 is a flow chart of recording key frame data of each frame on a designated path and a corresponding pose according to an embodiment of the present disclosure. As shown in FIG. 2, the step of recording the key frame data of each frame on the designated path and the corresponding pose can include the following steps.

S1011: collecting the key frame data of a first frame, and determining a pose and an odometer value of the key frame data of the first frame.

The key frame data of the first frame is laser data of the first frame after the successful relocalization, and the pose of the key frame data of the first frame is the pose calculated through the relocalization process.

In this embodiment, the odometer value can be obtained based on the data of an odometer composed of a chassis (e.g., a wheeled chassis or a foot chassis) disposed on the robot or based on integral data of an odometer composed of an inertial measurement unit (IMU) disposed on the robot. Furthermore, it can also perform a fusion computing on the data of the chassis and the integral data of the IMU to obtain the fused odometer value.

S1012: collecting laser data of a current frame at a preset data collection frequency, and determining an odometer value of the laser data of the current frame.

Generally, the robot can collect the laser data at a preset data collection frequency, so as to collect one frame of laser data at a certain time interval. The data collection frequency can be set according to the actual condition, which is not limited herein. The process for estimating the odometer value of each frame of the laser data is similar to that in step S1011. For details, refer to the foregoing content, which are not described herein.

S1013: calculating an estimated pose of the laser data of the current frame based on the odometer value of the laser data of the current frame and a pose and an odometer value of laser data of a previous frame of the current frame.

That is, the pose of each frame of the laser data is estimated based on the laser data of its previous frame and the odometer value of the two frames of the laser data. In this embodiment, any pose estimation methods such as dead reckoning can be used for the estimation.

S1014: determining whether the laser data of the current frame is the key frame data of a new frame based on the estimated pose of the laser data of the current frame and a pose of reference key frame data.

In which, the reference key frame data is the key frame data of the previous frame.

In this embodiment, after the estimated pose of the laser data of the current frame is calculated, it can calculate a distance difference and an angle difference between the estimated pose of the laser data of the current frame and the pose of the reference key frame data. If the distance difference is greater than a preset distance threshold or the angle difference is greater than a preset angle threshold, it determines that the laser data of the current frame as the key frame data of the new frame; otherwise, if the distance difference is less than or equal to the distance threshold and the angle difference is less than or equal to the angle threshold, it determines that the laser data of the current frame as not the key frame data of the new frame. In which, the values of the distance threshold and the angle threshold can be set according to actual conditions, which are not limited herein.

In this embodiment, if a time difference between a collection time of the laser data of the current frame and a collection time of the reference key frame data is greater than a preset time threshold, it can also determine the laser data of the current frame as the key laser data of the new frame. In which, the value of the time threshold can be set according to actual conditions, which are not limited herein.

If the laser data of the current frame is not the key frame data of the new frame, it return to execute step S1012 and the subsequent steps, that is, the new laser data of the current frame is recollected while the reference key frame data remains unchanged until the laser data of the current frame is the key frame data of the new frame. If the laser data of the current frame is the key frame data of the new frame, step S1015 is executed.

S1015: matching the estimated pose of the laser data of the current frame with a preset probability grid map to obtain a precise pose of the laser data of the current frame.

If the accuracy of an odometer (which is composed of a visual sensor or a chassis) of the robot is greater than a preset accuracy threshold, the estimated pose of the laser data of the current frame is used as an initial coordinate to perform an optimization matching with respect to the probability grid map so as to obtain the precise pose of the laser data of the current frame. In which, the value of the accuracy threshold can be set according to actual conditions, which are not limited herein.

Otherwise, if the accuracy of the odometer of the robot is less than or equal to the accuracy threshold, it first uses the estimated pose of the laser data of the current frame as the initial coordinate to perform an iterative closest point (ICP) matching or a template matching with respect to the probability grid map so as to obtain a first precise coordinate of the laser data of the current frame, and then use the first precise coordinate of the laser data of the current frame as the initial coordinate to perform an optimization matching with respect to the probability grid map so as to obtain the precise pose of the laser data of the current frame.

It should be noted that, the process shown in FIG. 2 is a cyclic and iterative process. After step S1015 is executed, it will return to execute step S1012 and the subsequent steps, that is, the new laser data of the current frame is recollected, the key frame data of the new frame is used as the reference key frame data, and the forgoing process is repeated until the laser data of each frame on the designated path is all traversed.

S102: creating a new navigation map, and copying information in an original navigation map (e.g., an existing navigation map) into the new navigation map.

If there is a difference between the resolutions of the new navigation map and the original navigation map, it is necessary to convert the resolution in the process of copying the map so as to adapt to the new navigation map.

S103: covering the key frame data of each frame on the designated path onto the new navigation map to obtain an updated navigation map.

The navigation map is a raster map in the format of ordinary images. Each pixel in the map has 3 possible values respectively represent with objects, without objects, and unknowns, which are generally represented by black, white, and gray, respectively. The area where a laser beam passes (i.e., the open area) is covered with white, and a laser spot (i.e., an obstacle) is covered with black.

In this embodiment, if the pixels outside the laser beam are not first type pixels, it can cover the pixels outside the laser beam as the first type pixels, where the first type pixels are pixels representing an unknown area.

According to the principle of laser beam propagation, after a laser beam is blocked by an obstacle, the entire area outside the laser beam are unknown, that is, it should be gray pixels. If the pixels outside the laser beam are black pixels or white pixels, since they does not conform to the principle of laser beam propagation, it can search outwards along the direction of the laser beam and cover the black or white pixels searched as gray pixels until a gray pixel is found.

Figure 3:
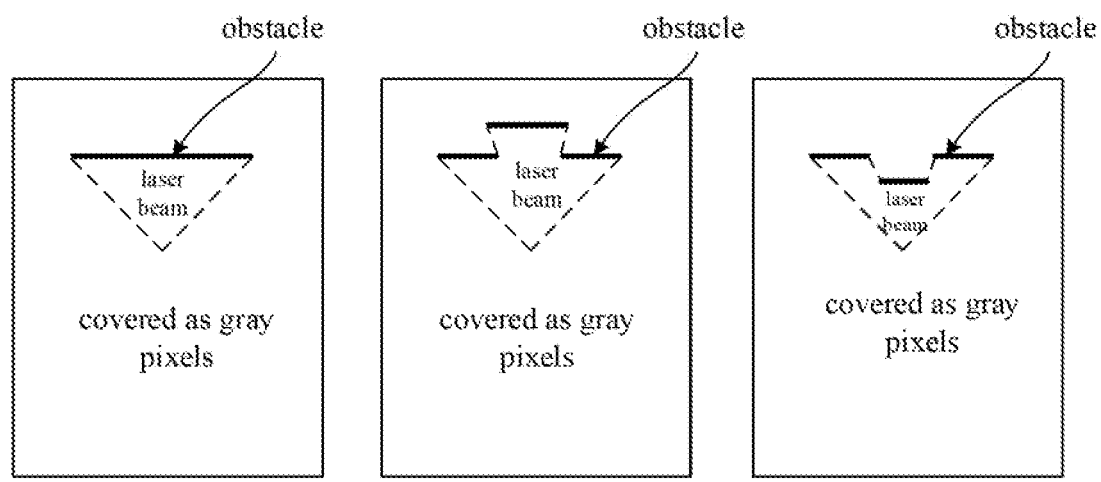
FIG. 3 is a schematic diagram of an example of covering key frame data of each frame on the designated path onto a new navigation map according to an embodiment of the present disclosure.

FIG. 3 is a schematic diagram of an example of covering key frame data of each frame on the designated path onto a new navigation map according to an embodiment of the present disclosure. As shown in FIG. 3, the left is the navigation map obtained by copying, the middle is the map that the searching and covering for the outer side of the laser beam is not required, that is, the navigation map obtained by directly covering the key frame data, and the right is the map that the searching and covering and the outer side of the laser beam is required. In comparison with the navigation map on the left, in the navigation map on the right, the black or white pixels outside the laser beam are all covered as gray pixels.

Furthermore, in order to improve the accuracy of the navigation map, a denoising process can be performed after step S103.

In one embodiment, it can create a new probability grid map, copy information in original probability grid map (e.g., the preset probability grid map) into the new probability grid map, cover the key frame data of each frame on the designated path into the new probability grid map to obtain an updated probability grid map. In which, the value of each pixel in the probability grid map represents the probabilities that the pixel is occupied and unoccupied.

After obtaining the updated probability grid map, it can denoise the updated navigation map based on the updated probability grid map. In which, the denoising method can include, but is not limited to, the methods as follows.

Method 1: identifying the black area in the updated navigation map that has the area smaller than N1. If the probability of the black points in the area being in the updated probability grid map is less than P, the point may be an afterimage left by a dynamic object, and it is modified to be white. In which, N1 is a preset area threshold, and P is a preset probability threshold. The values can be set according to actual conditions, which are not limited herein.

Method 2: identifying the area in the updated navigation map that has the total number of the pixels of the black area smaller than K. The points in the area may be noise points, and they are ally modified to white. In which, K is a preset number threshold, which is set to 2 in this embodiment. It can also be set according to the actual conditions, which are not limited herein.

Method 3: identifying the gray area on the updated navigation map. If the area of the gray area is smaller than N2 and the color of its surrounding area is white, the area is filled with white. In which, N2 is a preset area threshold, which can be set according to the actual condition, and are not limited herein.

Through the forgoing process, a denoised navigation map can be obtained.

In this embodiment, the navigation map updating method can be used in various scenarios including manual scenario, semi-automatic scenario, automatic scenario, and the like. The methods to use the navigation map updating method in the scenarios are described as follows.

Scenario 1: manually update the navigation map.

In which, a navigation map updating function is manually started in a certain place; the robot is relocalized to obtain the pose of the robot on the navigation map; the robot is controlled to move through a path of the scene to be updated, while the laser data of the key frames in the process and the corresponding are recorded; the robot is stopped at a certain position and the updating of the navigation map is started manually; and after updating the navigation map, a confirm is performed manually, and the original navigation map is replaced using the updated map if the map updates well, otherwise the updating is cancelled.

Scenario 2: semi-automatically update the navigation map.

In which, a navigation path on the navigation map that is for updating map is manually planned, where a part of the navigation map that is passed by the path will be updated; the robot is manually started to update the navigation map; the robot is relocalized to obtain the pose on the map; the robot is moved along the planned navigation path to the end point, while the laser data of the key frame and the corresponding coordinate are recorded during the navigation; after reaching the end point, the robot automatically starts to update the navigation map; and after updating the navigation map, a manual confirmation is performed, and the original navigation map is replaced using the updated map if the map updates well, otherwise the updating is cancelled.

Scenario 3: Automatically update the navigation map.

In which, a navigation path on the navigation map that is for updating map is manually planned; the robot is manually started to update the navigation map; the robot is relocalized to obtain the pose on the map; a scheduled task is set to make the robot to start regularly when there are few people in the scene, or the robot is remotely started manually to automatically update the navigation map; the robot starts to move along the planned navigation path to the end point, while the laser data of the key frame and the corresponding coordinate are recorded during the navigation; after reaching the end point, the robot automatically starts to update the navigation map; after updating the navigation map, the robot sends the first manually created navigation map and the navigation maps before and after the automatic updates to a remote server; and the user confirms the updating effect of the map on the server, and the original navigation map is replaced using the updated map if the map updates well, otherwise the updating is cancelled.

In summary, in this embodiment, the method includes: controlling a robot to move along a designated path after a successful relocalization of the robot, and recording key frame data of each frame on the designated path and a corresponding pose; creating a new navigation map, and copying information in an original navigation map into the new navigation map; and covering the key frame data of each frame on the designated path onto the new navigation map to obtain an updated navigation map. In this manner, there is no need for the user to manipulate the robot to recreate the map at the environment where the robot is operated, which saves a lot of time and manpower.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 4 is a schematic block diagram of an embodiment of a navigation map updating apparatus according to the present disclosure. In this embodiment, a navigation map updating apparatus is provided, which corresponds to the forgoing embodiment of the navigation map updating method, and can be applied to a robot as shown in FIG. 5 or be the robot of FIG. 5 itself. As shown in FIG. 4, the navigation map updating apparatus includes:

a key frame data recording module 401 configured to control the robot to move along a designated path after a successful relocalization of the robot, and record key frame data of each frame on the designated path and a corresponding pose;

a navigation map copying module 402 configured to create a new navigation map, and copy information in an original navigation map into the new navigation map; and a key frame data covering module 403 configured to cover the key frame data of each frame on the designated path onto the new navigation map to obtain an updated navigation map.

Furthermore, the key frame data recording module 401 may include:

a first collection unit configured to collect the key frame data of a first frame, and determine a pose and an odometer value of the key frame data of the first frame, where the key frame data of the first frame is laser data of the first frame after the successful relocalization;

a second collection unit configured to collect laser data of a current frame at a preset data collection frequency, and determine an odometer value of the laser data of the current frame;

a pose estimation unit configured to calculate an estimated pose of the laser data of the current frame based on the odometer value of the laser data of the current frame and a pose and an odometer value of laser data of a previous frame of the current frame;

a key frame determination unit configured to determine whether the laser data of the current frame is the key frame data of a new frame based on the estimated pose of the laser data of the current frame and a pose of reference key frame data, where the reference key frame data is the key frame data of the previous frame; and a map matching unit configured to match the estimated pose of the laser data of the current frame with a preset probability grid map to obtain a precise pose of the laser data of the current frame, if the laser data of the current frame is the key frame data of the new frame.

Furthermore, the key frame determination unit may include:

a difference calculation subunit configured to calculate a distance difference and an angle difference between the estimated pose of the laser data of the current frame and the pose of the reference key frame data; and a key frame determination subunit configured to determine the laser data of the current frame as the key frame data of the new frame, if the distance difference is greater than a preset distance threshold or the angle difference is greater than a preset angle threshold.

Furthermore, the map matching unit may include:

a first matching subunit configured to use the estimated pose of the laser data of the current frame as an initial coordinate to perform an optimization matching with respect to the probability grid map so as to obtain the precise pose of the laser data of the current frame, if the accuracy of an odometer of the robot is greater than a preset accuracy threshold;

a second matching subunit configured to use the estimated pose of the laser data of the current frame as the initial coordinate to perform one of an ICP matching and a template matching with respect to the probability grid map so as to obtain a first precise coordinate of the laser data of the current frame; and a third matching subunit configured to use the first precise coordinate of the laser data of the current frame as the initial coordinate to perform an optimization matching with respect to the probability grid map so as to obtain the precise pose of the laser data of the current frame.

Furthermore, the navigation map updating apparatus may further include:

an outer side covering module configured to cover pixels outside a laser beam as first type pixels if the pixels outside the laser beam is not the first type pixels, where the first type pixels are pixels representing an unknown area.

Furthermore, the navigation map updating apparatus may further include:

a probability grid map copying module configured to create a new probability grid map, and copying information in original probability grid map into the new probability grid map;

a probability grid map covering module configured to cover the key frame data of each frame on the designated path into the new probability grid map to obtain an updated probability grid map; and a denoising module configured to denoise the updated navigation map based on the updated probability grid map to obtain a denoised navigation map.

In this embodiment, each of the above-mentioned modules/units is implemented in the form of software, which can be computer program(s) stored in a memory of the navigation map updating apparatus and executable on a processor of the navigation map updating apparatus. In other embodiments, each of the above-mentioned modules/units may be implemented in the form of hardware (e.g., a circuit of the navigation map updating apparatus which is coupled to the processor of the navigation map updating apparatus) or a combination of hardware and software (e.g., a circuit with a single chip microcomputer).

Those skilled in the art can clearly understand that, for the convenience and brevity of description, the specific working processes of the apparatus, modules, and units described above can refer to the corresponding processes in the foregoing method embodiments, where are not described herein.

In the above-mentioned embodiments, the description of each embodiment has its focuses, and the parts which are not described or mentioned in one embodiment may refer to the related descriptions in other embodiments.

FIG. 5 is a schematic block diagram an embodiment of a robot according to the present disclosure. In this embodiment, a robot 5 is provided. For ease of description, only the parts related to this embodiment are shown.

As shown in FIG. 5, in this embodiment, the robot 5 includes a processor 50, a storage 51, a computer program 52 stored in the storage 51 and executable on the processor 50, and a sensor 53 such as a lidar, an IMU, or an odometer.

When executing (instructions in) the computer program 52, the processor 50 implements the steps in the above-mentioned embodiments of the navigation map updating method, for example, steps S101-S103 shown in FIG. 1. Alternatively, when the processor 50 executes the (instructions in) computer program 52, the functions of each module/unit in the above-mentioned device embodiments, for example, the functions of the modules 401-403 shown in FIG. 4 are implemented.

Exemplarily, the computer program 52 may be divided into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the robot 5.

It can be understood by those skilled in the art that FIG. 4 is merely an example of the robot 5 and does not constitute a limitation on the robot 5, and may include more or fewer components than those shown in the figure, or a combination of some components or different components. For example, the robot 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the robot 5, for example, a hard disk or a memory of the robot 5. The storage 51 may also be an external storage device of the robot 5, for example, a plug-in hard disk, a smart media card (SMC), a secure digital (SD) card, flash card, and the like, which is equipped on the robot 5. Furthermore, the storage 51 may further include both an internal storage unit and an external storage device, of the robot 5. The storage 51 is configured to store the computer program 52 and other programs and data required by the robot 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented navigation map updating method, comprising:
   providing a robot comprising a processor, a storage storing an existing navigation map and a preset probability grid map, and a sensor, wherein the storage and the sensor are electrically coupled to the processor;
   performing, by the processor, a relocalization of the robot;
   controlling, by the processor, the robot to move along a designated path, and recording key frame data of each frame on the designated path and a corresponding pose, wherein the key frame data of each frame on the designated path is obtained by the sensor;
   creating, by the processor, a navigation map in the storage, and copying information in the existing navigation map into the created navigation map to obtain a first navigation map;
   covering, by the processor, the key frame data of each frame on the designated path onto the first navigation map to obtain a second navigation map;
   creating, by the processor, a probability grid map in the storage, and copying information in the preset probability grid map into the created probability grid map to obtain a first probability grid map;
   covering, by the processor, the key frame data of each frame on the designated path into the first probability grid map to obtain a second probability grid map; and
   denoising, by the processor, the second navigation map based on the second probability grid map to obtain a third navigation map, and sending the third navigation map to a remote server.

2. The method of claim 1, wherein the sensor comprises a lidar, and recording the key frame data of each frame on the designated path and the corresponding pose comprises:
   collecting, by the lidar, laser data of a current frame at a preset data collection frequency, and determining, by the processor, an odometer value of the laser data of the current frame;
   calculating, by the processor, an estimated pose of the laser data of the current frame based on the odometer value of the laser data of the current frame and a pose and an odometer value of laser data of a previous frame of the current frame;
   determining, by the processor, whether the laser data of the current frame is different from reference key frame data based on the estimated pose of the laser data of the current frame and a pose of the reference key frame data, wherein the reference key frame data is key frame data of the previous frame; and
   matching, by the processor, the estimated pose of the laser data of the current frame with the preset probability grid map to obtain a pose of the laser data of the current frame, in response to the laser data of the current frame being different from the reference key frame data.

3. The method of claim 2, wherein determining, by the processor, whether the laser data of the current frame is different from the reference key frame data based on the estimated pose of the laser data of the current frame and the pose of the reference key frame data comprises:
   calculating, by the processor, a distance difference and an angle difference between the estimated pose of the laser data of the current frame and the pose of the reference key frame data; and
   determining, by the processor, the laser data of the current frame is different from the reference key frame data, in response to the distance difference being greater than a preset distance threshold or the angle difference being greater than a preset angle threshold.

4. The method of claim 2, wherein matching, by the processor, the estimated pose of the laser data of the current frame with the preset probability grid map to obtain the pose of the laser data of the current frame comprises:
   using, by the processor, the estimated pose of the laser data of the current frame as an initial coordinate to perform an optimization matching with respect to the preset probability grid map so as to obtain the pose of the laser data of the current frame, in response to an accuracy of an odometer of the robot being greater than a preset accuracy threshold.

5. The method of claim 2, wherein matching, by the processor, the estimated pose of the laser data of the current frame with the preset probability grid map to obtain the pose of the laser data of the current frame comprises:
   using, by the processor, the estimated pose of the laser data of the current frame as the initial coordinate to perform one of an iterative closest point (ICP) matching and a template matching with respect to the preset probability grid map so as to obtain a first coordinate of the laser data of the current frame; and
   using, by the processor, the first coordinate of the laser data of the current frame as the initial coordinate to perform an optimization matching with respect to the preset probability grid map so as to obtain the pose of the laser data of the current frame.

6. The method of claim 2, wherein the odometer value of the laser data of the current frame and the odometer value of laser data of the previous frame of the current frame are obtained based on data of an odometer composed of a chassis disposed on the robot or based on integral data of an odometer composed of an inertial measurement unit (IMU) disposed on the robot.

7. The method of claim 2, wherein the odometer value of the laser data of the current frame and the odometer value of laser data of the previous frame of the current frame are obtained by performing a fusion computing on data of an odometer composed of a chassis disposed on the robot and integral data of an odometer composed of an inertial measurement unit (IMU) disposed on the robot.

8. The method of claim 1, wherein after covering, by the processor, the key frame data of each frame on the designated path onto the first navigation map to obtain the second navigation map, further comprises:
   covering, by the processor, pixels outside a laser beam as gray pixels in response to the pixels outside the laser beam being not the gray pixels, wherein the gray pixels are configured for representing an unknown area.

9. The method of claim 1, wherein a resolution conversion is performed during copying the information in the existing navigation map into the created navigation map.

10. The method of claim 1, wherein denoising, by the processor, the second navigation map based on the second probability grid map to obtain the third navigation map comprises:
- identifying, by the processor, a black area in the second navigation map that has an area smaller than a preset area threshold; and
- in response to a probability of black points in the identified area in the second probability grid map being less than a preset probability threshold, modifying, by the processor, the black points in the identified area to white.

11. The method of claim 1, wherein denoising, by the processor, the second navigation map based on the second probability grid map to obtain the third navigation map comprises:
- identifying, by the processor, an area in the second navigation map that has a total number of pixels of a black area smaller than a preset number threshold; and
- modifying, by the processor, points in the identified area to white.

12. The method of claim 1, wherein denoising, by the processor, the second navigation map based on the second probability grid map to obtain a third navigation map comprises:
- identifying, by the processor, a gray area in the second navigation map; and
- in response to an area of the gray area being smaller than a preset area threshold and a color of surrounding area of the gray area being white, filling, by the processor, the gray area with white.

13. A robot comprising:
- a non-transitory memory;
- a sensor; and
- a processor electrically coupled to the non-transitory memory and the sensor;
- wherein the non-transitory memory stores an existing navigation map, a preset probability grid map, and a computer program executable on the processor, and the computer program comprises:
- instructions for performing a relocalization of the robot;
- instructions for controlling the robot to move along a designated path, and recording key frame data of each frame on the designated path and a corresponding pose, wherein the key frame data of each frame on the designated path is obtained by the sensor;
- instructions for creating a navigation map in the non-transitory memory, and copying information in the existing navigation map into the created navigation map to obtain a first navigation map;
- instructions for covering the key frame data of each frame on the designated path onto the first navigation map to obtain a second navigation map;
- instructions for creating a probability grid map in the non-transitory memory, and copying information in the preset probability grid map into the created probability grid map to obtain a first probability grid map;
- instructions for covering the key frame data of each frame on the designated path into the first probability grid map to obtain a second probability grid map; and
- instructions for denoising the second navigation map based on the second probability grid map to obtain a third navigation map, and sending the third navigation map to a remote server.

14. The robot of claim 13, wherein the sensor comprises a lidar, the instructions for recording the key frame data of each frame on the designated path and the corresponding pose comprise:
- instructions for collecting, by the lidar, laser data of a current frame at a preset data collection frequency, and determining an odometer value of the laser data of the current frame;
- instructions for calculating an estimated pose of the laser data of the current frame based on the odometer value of the laser data of the current frame and a pose and an odometer value of laser data of a previous frame of the current frame;
- instructions for determining whether the laser data of the current frame is different from reference key frame data based on the estimated pose of the laser data of the current frame and a pose of the reference key frame data, wherein the reference key frame data is key frame data of the previous frame; and
- instructions for matching the estimated pose of the laser data of the current frame with the preset probability grid map to obtain a pose of the laser data of the current frame, in response to the laser data of the current frame being different from the reference key frame data.

15. The robot of claim 14, wherein the instructions for determining whether the laser data of the current frame is different from the reference key frame data based on the estimated pose of the laser data of the current frame and the pose of the reference key frame data comprise:
- instructions for calculating a distance difference and an angle difference between the estimated pose of the laser data of the current frame and the pose of the reference key frame data; and
- instructions for determining the laser data of the current frame is different from the reference key frame data, in response to the distance difference being greater than a preset distance threshold or the angle difference being greater than a preset angle threshold.

16. The robot of claim 14, wherein the instructions for matching the estimated pose of the laser data of the current frame with the preset probability grid map to obtain the pose of the laser data of the current frame comprise:
- instructions for using the estimated pose of the laser data of the current frame as an initial coordinate to perform an optimization matching with respect to the preset probability grid map so as to obtain the pose of the laser data of the current frame, in response to an accuracy of an odometer of the robot being greater than a preset accuracy threshold.

17. The robot of claim 14, wherein the instructions for matching the estimated pose of the laser data of the current frame with the preset probability grid map to obtain the pose of the laser data of the current frame comprise:
- instructions for using the estimated pose of the laser data of the current frame as the initial coordinate to perform one of an iterative closest point (ICP) matching and a template matching with respect to the preset probability grid map so as to obtain a first coordinate of the laser data of the current frame; and
- instructions for using the first coordinate of the laser data of the current frame as the initial coordinate to perform an optimization matching with respect to the preset probability grid map so as to obtain the pose of the laser data of the current frame.

18. The method of claim 14, wherein the odometer value of the laser data of the current frame and the odometer value of laser data of the previous frame of the current frame are obtained based on data of an odometer composed of a chassis disposed on the robot or based on integral data of an odometer composed of an inertial measurement unit (IMU) disposed on the robot.

19. The method of claim 14, wherein the odometer value of the laser data of the current frame and the odometer value of laser data of the previous frame of the current frame are obtained by performing a fusion computing on data of an odometer composed of a chassis disposed on the robot and integral data of an odometer composed of an inertial measurement unit (IMU) disposed on the robot.

20. The robot of claim 13, wherein the computer program further comprises:
  instructions for covering, by the processor, pixels outside a laser beam as gray pixels in response to the pixels outside the laser beam being not the gray pixels, wherein the gray pixels are configured for representing an unknown area.

* * * * *